(12) United States Patent
Fernandez et al.

(10) Patent No.: US 9,988,570 B2
(45) Date of Patent: Jun. 5, 2018

(54) COMPOSITION FOR USE IN CONDUCTING DOWNHOLE OPERATIONS IN OIL AND GAS WELLS

(71) Applicants: Jorge M. Fernandez, Westlake, LA (US); Christian W. Jones, Westlake, LA (US)

(72) Inventors: Jorge M. Fernandez, Westlake, LA (US); Christian W. Jones, Westlake, LA (US)

(73) Assignee: Sasol Performance Chemicals GmbH, Hamburg (DE)

( * ) Notice: Subject to any disclaimer, the term of this patent is extended or adjusted under 35 U.S.C. 154(b) by 0 days. days.

(21) Appl. No.: 14/902,865

(22) PCT Filed: Jul. 18, 2014

(86) PCT No.: PCT/US2014/047182
§ 371 (c)(1),
(2) Date: Jan. 5, 2016

(87) PCT Pub. No.: WO2015/010011
PCT Pub. Date: Jan. 22, 2015

(65) Prior Publication Data
US 2016/0152883 A1 Jun. 2, 2016

Related U.S. Application Data

(60) Provisional application No. 61/856,200, filed on Jul. 19, 2013.

(51) Int. Cl.
*C09K 8/34* (2006.01)
*C09K 8/502* (2006.01)
*C09K 8/64* (2006.01)

(52) U.S. Cl.
CPC ............. *C09K 8/34* (2013.01); *C09K 8/502* (2013.01); *C09K 8/64* (2013.01)

(58) Field of Classification Search
None
See application file for complete search history.

(56) References Cited

U.S. PATENT DOCUMENTS 4,439,328 A * 3/1984 Moity ............... C09K 8/035
507/103
4,828,723 A 5/1989 Cao et al.
(Continued)

FOREIGN PATENT DOCUMENTS

EP 1316577 6/2003

*Primary Examiner* — Jeffrey Washville
(74) *Attorney, Agent, or Firm* — Bushman Werner, P.C.

(57) ABSTRACT

A composition for viscosifying a nonaqueous base liquid. The composition has glycerin carbonate and optionally an alkoxylated alcohol having the formula: wherein R is a linear or branched alkyl from 2 to 18 carbon atoms, or an aromatic radical having the structure: where $R_1$ is a branched or linear alkyl having from 2 to 18 carbon atoms $R_2$ is H or $CH_3$ $R_3$ is H or $CH_3$ a is from 0 to 12 and b is from 1 to 12. The base liquid having greater than 20% naphthenics and about 10% to about 35% isoparaffins.

(Continued)

9 Claims, 7 Drawing Sheets (56) References Cited

U.S. PATENT DOCUMENTS

| | | | | |
|---|---|---|---|---|
| 5,298,070 | A * | 3/1994 | Cowan | C04B 24/16 |
| | | | | 106/724 |
| 6,620,769 | B1 | 9/2003 | Juppe et al. | |
| 7,757,766 | B2 * | 7/2010 | Lewis | C04B 28/02 |
| | | | | 106/677 |
| 2002/0192267 | A1 * | 12/2002 | Smadi | A61K 8/0208 |
| | | | | 424/443 |
| 2007/0071703 | A1 * | 3/2007 | Lin | A61K 8/042 |
| | | | | 424/70.12 |
| 2013/0172450 | A1 | 7/2013 | Lewis et al. | |
| 2014/0034323 | A1 | 2/2014 | Dobson et al. | |
| 2014/0110115 | A1 * | 4/2014 | Reddy | E21B 43/16 |
| | | | | 166/294 |

* cited by examiner

COMPOSITION FOR USE IN CONDUCTING DOWNHOLE OPERATIONS IN OIL AND GAS WELLS

CROSS-REFERENCE TO RELATED APPLICATION

This application claims priority to U.S. Application No. 61/856,200, filed on Jul. 19, 2013, the disclosure of which is incorporated herein by reference for all purposes.

FIELD OF THE INVENTION

The present invention relates to the viscosification of non-aqueous fluids and more particularly to the viscosification of wellbore fluids. In particular, the invention relates to activators for use in exfoliating organophilic clays used in various applications, e.g., wellbore fluids.

BACKGROUND OF THE INVENTION

Organophilic clays are widely used as rheological control agents in a wide variety of solvent systems. In particular, organophilic clays have found wide usage in wellbore fluids, used in operations related to the development, completion and production of natural hydrocarbon reservoirs. Typical operations include drilling, fracturing subterranean formations, modifying the permeability of subterranean formations, logging operations, sand control, packer fluids, etc.

In particular, in deep well drilling, the use of organophilic clays in oil-based muds have certain advantages despite their considerably higher initial cost. The advantages of oil-based fluids are apparent in water-sensitive formations, e.g., swelling shale, insoluble salt formations, and at high temperatures. These fluids are used for drill stem lubrication, particularly in drilling curved or deviated wells, for corrosion protection and they have the further advantage of being reusable.

One of the primary functions of organophilic clays in oil-based wellbore fluids, as well as other non-aqueous based fluids (i.e glycol ethers), is to act as viscosifiers. However, it is well known that for organophilic clays to swell in or viscosify a non-aqueous wellbore fluid it is usually necessary to use small amounts of polar molecules as activators. Typical activators for use with clay-type thixotropic viscosifying agent such as organophilic clays include water, ethanol, methanol, glycols, sodium silicate, sodium fluoride, magnesium silico fluoride, calcium carbonate, polar aprotic compounds, etc. An especially preferred and widely used activator is propylene carbonate.

SUMMARY OF THE INVENTION

In one aspect, the present invention provides an exfoliating agent for use in non-aqueous fluids, particularly non-aqueous wellbore fluids.

In another aspect, the present invention provides a viscosifying package for use in non-aqueous fluids.

In still another aspect, the present invention provides a wellbore fluid comprised of a non-aqueous fluid, e.g., a hydrocarbon base fluid, an organophilic clay and an exfoliating agent.

In still a further aspect, the present invention provides a wellbore fluid comprised of a hydrocarbon based fluid having a significant content of naphthenics and/or branched hydrocarbons, an organophilic clay, and an exfoliating agent.

These and further features and advantages of the present invention will become apparent from the following detailed description, wherein reference is made to the figures in the accompanying drawings.

DETAILED DESCRIPTION OF PREFERRED EMBODIMENTS

The term "wellbore fluid" or similar terms refers to any fluid which is used in any phase of the exploration, drilling or production of oil and gas from subterranean formations.

The compositions of the present invention, as will be seen below, can employ a base oil including pure hydrocarbon mixtures as well as a hydrocarbon in admixture with oxygenated compounds. In general, the base oil useful in the compositions of the present inventions comprise base oils with a significant content of naphthenic and/or highly branched paraffins. As a general rule, the base oil can contain from about 20% to about 99% or greater naphthenics, isoparaffins, or a mixture thereof. In particular, the base oil having this composition will contain from about C8 to about C30. In Table 1 below, there are shown non-limiting examples of the wide variety of base oils which can be employed in the composition of the present invention.

TABLE 1

|  | LPA | LPA-142 | LPA-170 | LPA-210 | Diesel | HF-1000 | ODC-15 |
|---|---|---|---|---|---|---|---|
| Linear Isoparaffins (mol %) | 25 | 21 | 28 | 30 | 41.3[1] | 20.9 14 | 25 |
| Olefins | — | — | — | — | — | 24.89 | — |
| Napthenics (mono-cyclic) (mol %) | 62 | 64 | 60 | 69 | 22.1[2] | 30 | 47 |
| Decalins (bi-cyclic) (mol %) | 13 | 15 | 12 | 1 | 11.9[3] | — | 10 |
| Aromatics | — | — | — | — | 24.7 | — | 15 |
| Oxygenates | — | — | — | — | — | 3.84 | — |
| Carbon chain range | C10-C16 | C-11-C12 | C12-C14 | C14-C16 | C10-C20 | C12-C22 | |

[1]Depends on specific diesel
[2]Also contains 2.3% tricyclic
[3]Alcohols, esters As can be seen from the above Table 1, the base oil can comprise liquid hydrocarbon having from about 10% to about 35% isoparaffins, from about 30% to about 73% naphthenics, and having a carbon chain length of from about C8 to about C30. As can also be seen from Table 1, some of the base oils can include significant amounts of linear paraffins while others can contain small amounts of oxygenates such as alcohols, esters, or the like. As should be further apparent from Table 1, some of the base oils can contain olefins while others, e.g., diesel, can contain significant amounts of aromatics. Table 1 demonstrates that the compositions of the present invention can employ, with advantage, a wide variety of base oils, all of which have significant hydrocarbon oil content, albeit that other compounds can be present in certain cases.

The organophilic clays that may be used in the compositions of the present invention include any clay in which the inorganic cations associated with the clay have been displaced by organic cations such as quarternary ammonium cations. Suitable organophilic clays include the reaction products of smectite-type, hectorite clays, or other clays and organic cations, i.e., quaternary ammonium cations (sometimes referred to as organophillic clay gellants); smectite clays; kaolin clays; and the like. The preferred organophilic clays used as a thixotropic viscosifying agent, in accordance with one aspect of the present invention, is a smectite-type clay that is selected from the group consisting of bentonite, hectorite, montmorillonite, nontronite, biedellite, saponite, stevensite, and mixtures thereof, most preferably bentonite or hectorite. The preferred quaternary ammonium cations, in the event that the clay used is the reaction product of a clay and a quaternary ammonium compound, are selected from the group consisting of methyl trihydrogenated tallow ammonium, dimethyl dehydrogenated tallow ammonium, dimethyl benzyl hydrogenated tallow ammonium, methyl benzyl dehydrogenated tallow ammonium, and mixtures thereof. Exemplary organoclays and clay gellants suitable for use with the compositions described herein are set forth in the following U.S. patents, all incorporated herein by reference in relevant part: U.S. Pat. No. 2,531,427; U.S. Pat. No. 2,966,506; U.S. Pat. No. 4,105,578; and U.S. Pat. No. 4,208,218. Exemplary, commercially available organophilic clays suitable for use with the compositions described herein are CLAYTONE® IMG 400 Claytone ER, Claytone EM, and Claytone II, available from Southern Clay Products, Inc., Gonzalez, Tex., U.S.A., or Bentone 34, Bentone 150 and BENTONE® 38 Organoclay (a commercial hectorite-based product, available form a number of suppliers).

The exfoliating agents of the present invention in general comprise glycerin carbonate in admixture with certain alkoxylated alcohols. The alkoxylated alcohols useful in the present invention will have the general formula:

wherein R is a linear or branched alkyl from 2 to 18 carbon atoms, or an aromatic radical having the structure:

where $R_1$ is a branched or linear alkyl having from 2 to 18 carbon atoms
$R_2$ is H or $CH_3$
$R_3$ is H or $CH_3$
a is from 0 to 12
and b is from 1 to 12.

The exfoliating agent of the present invention will generally comprise from about 10% to about 100% glycerin carbonate and from about 0% to about 90% alkoxylated alcohol where all amounts are by weight based on the combined weight of the glycerin carbonate and the alkoxylated alcohol. It will be understood though that different exfoliating agents have different effectiveness in different base oils. Therefore the composition of the exfoliating agent should be tailored to fit the base oil in question.

The exfoliating agent may be incorporated into the wellbore fluid in any number of ways, whether by separate or previous addition to the base oil and/or clay, or by admixture with base oil, clay, and other components at the time of preparation of the wellbore fluid. In certain cases a "pill" comprised of exfoliating agent and organophilic clay, alone or together with other components, can be employed, the pill being injected into the wellbore at a desired time.

The alkoxylated alcohol used in the examples which follow are ethoxylated alcohols sold by Sasol North America, Inc. under the trade name NOVEL®. As is well known to those skilled in the art, the ethoxylated alcohols are formed by reacting various alcohols with ethylene oxide under suitable reaction conditions. The resulting ethoxylated alcohol thus has an alkyl chain residue from the alcohol and the desired number of ethoxy groups. By way of example, an ethoxylated alcohol designated as NOVEL® 1012-9 means that the ethoxylated alcohol has an alkyl chain length with an average carbon number of 10-12 and 9 ethoxy groups. An ethoxylated alcohol designated as NOVEL® 23E9 will contain an alkyl chain of 12-13 carbon atoms with 9 ethoxy groups.

In general, the compositions of the present invention will contain from about 95% to about 98% base oil, from about 1% to about 5% organophilic clay and from about 0.005% to about 1% exfoliating agent, where all amounts are in weight % based on the total composition.

To more fully illustrate the present invention, the following non-limiting examples are presented.

Example 1

Three grams of Claytone® II organophilic clay was dispersed in 100 mL of diesel containing 1 mL of the exfoliating agent. The exfoliating agents are shown in Table 2 below. The exfoliating agents shown in Table 2 are used in Examples 2-7 as well.

TABLE 2

| Exfoliating agent | Content | | |
|---|---|---|---|
| Agent 1 | 0% glycerin carbonate (GC) | 50% NOVEL® 1012-9 | 50% NOVEL® 23E9 |
| Agent 2 | 33.33% glycerin carbonate (GC) | 33.33% NOVEL® 1012-9 | 33.33% NOVEL® 23E9 |
| Agent 3 | 60% glycerin carbonate (GC) | 20% NOVEL® 1012-9 | 20% NOVEL® 23E9 |
| Agent 4 | 70% glycerin carbonate (GC) | 15% NOVEL® 1012-9 | 15% NOVEL® 23E9 |
| Agent 5 | 80% glycerin carbonate (GC) | 10% NOVEL® 1012-9 | 10% NOVEL® 23E9 |
| Agent 6 | 100% glycerin carbonate (GC) | — | — |

Figure 1:
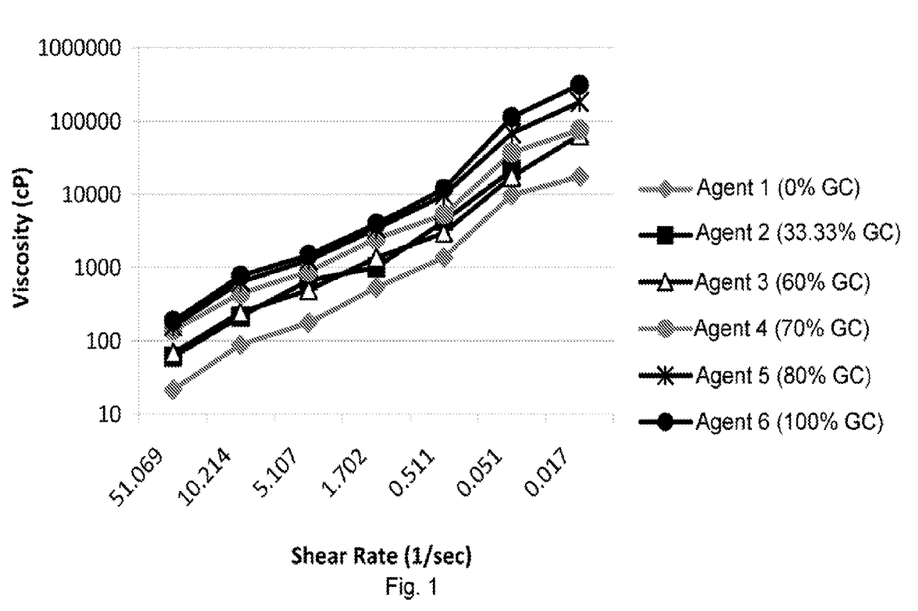
FIG. 1 is a graph showing the viscosity of various exfoliating agents in diesel.

The mixture was mixed for three minutes and then sheared at medium-high (3) for one minute on a TURRAX high shear mixer. The samples were aged overnight for 16 hours at room temperature. The samples were then rehomogenized for 30 seconds and tested on a Grace 3600 Viscometer. The results are shown in FIG. 1 and indicate that the highest viscosity was achieved using 100% glycerin carbonate.

Example 2

Figure 2:
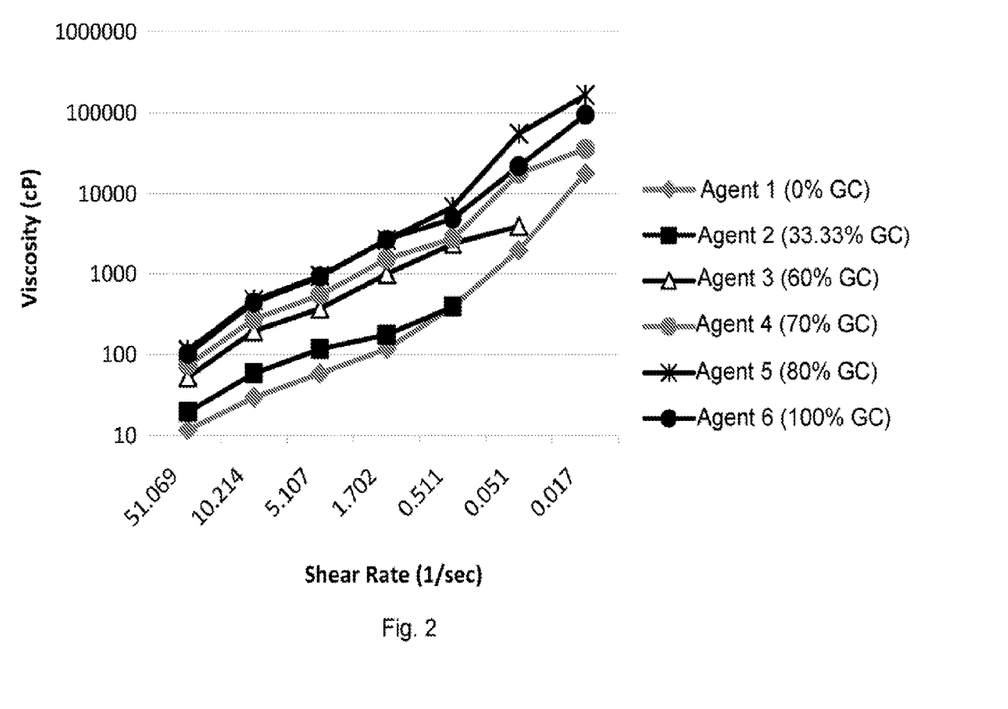
FIG. 2 is a graph showing the viscosity of various exfoliating agents in ODC-15.

The experiment of Example 1 was repeated, but the base oil used was ODC-15. The results are shown in FIG. 2 and indicate that the highest viscosity was achieved using 80% glycerin carbonate and 20% alkoxylated alcohols.

Example 3

Figure 3:
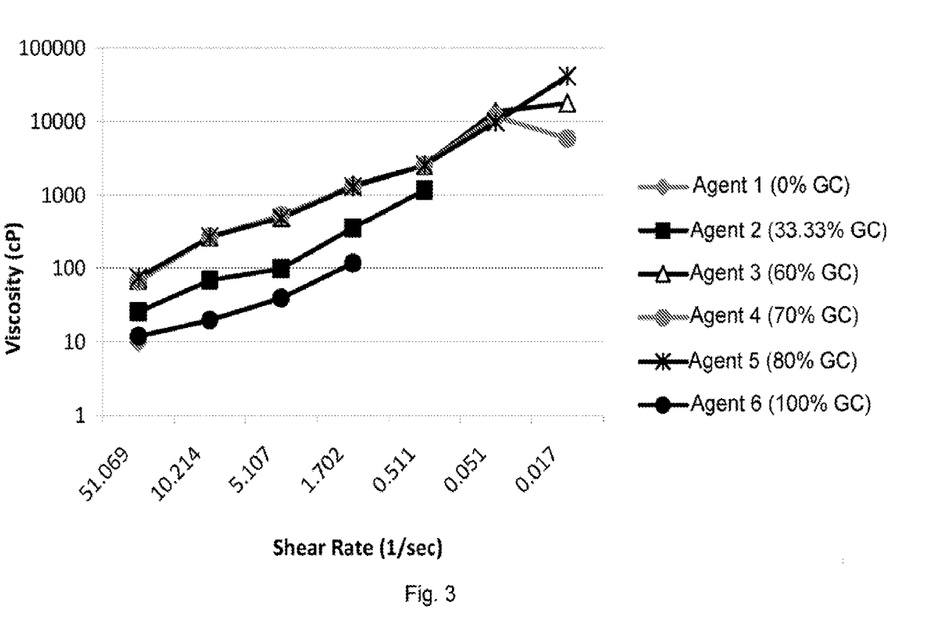
FIG. 3 is a graph showing the viscosity of various exfoliating agents in LPA.

The experiment of Example 1 was repeated, but the base oil used was LPA. The results are shown in FIG. 3 and indicate that the highest viscosity was achieved using 80% glycerin carbonate and 20% alkoxylated alcohols.

Example 4

Figure 4:
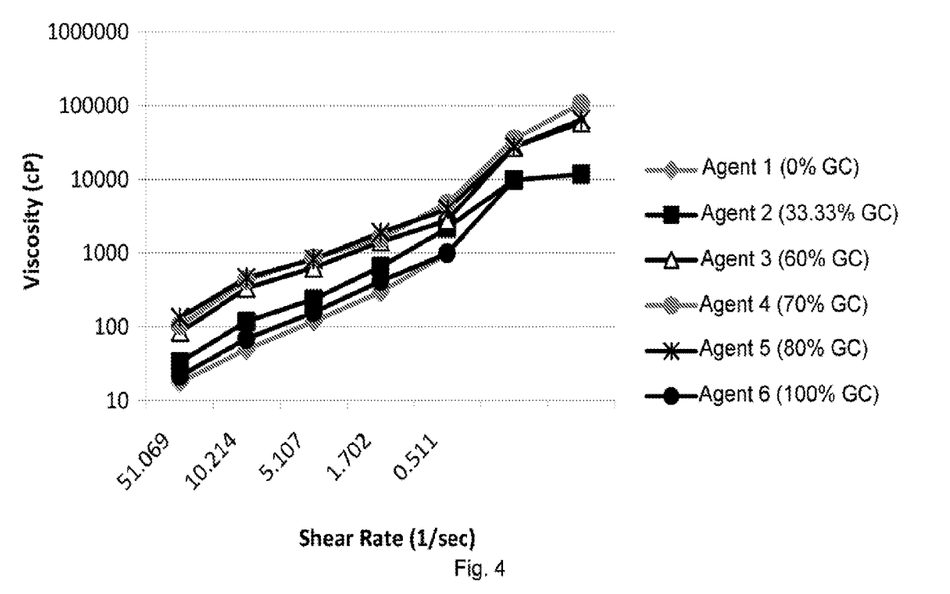
FIG. 4 is a graph showing the viscosity of various exfoliating agents in LPA-142.

The experiment of Example 1 was repeated, but the base oil used was LPA-142. The results are shown in FIG. 4 and indicate that the highest viscosity was achieved using 70% glycerin carbonate and 30% alkoxylated alcohols.

Example 5

Figure 5:
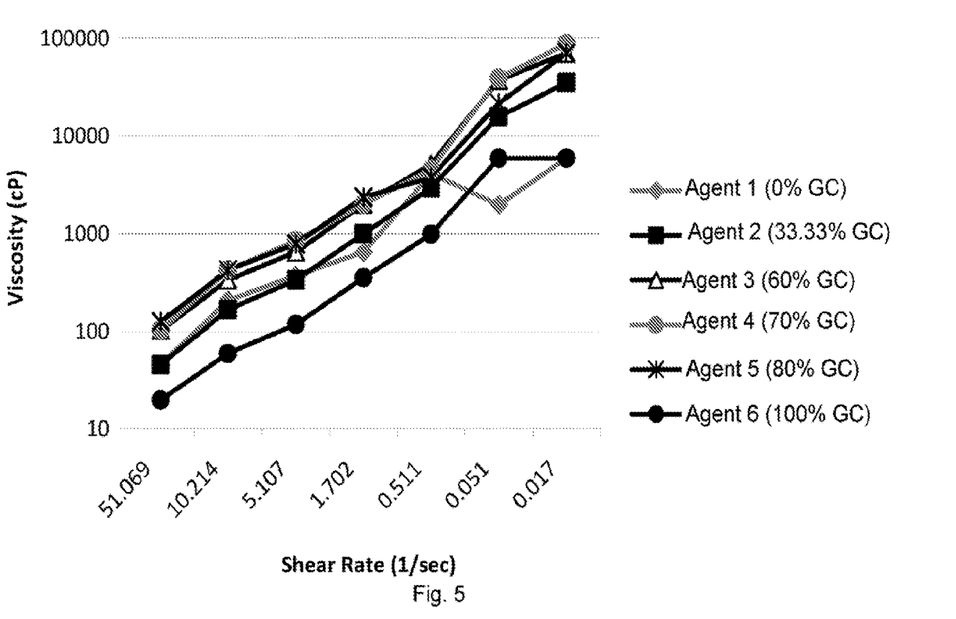
FIG. 5 is a graph showing the viscosity of various exfoliating agents in LPA-170.

The experiment of Example 1 was repeated, but the base oil used was LPA-170. The results are shown in FIG. 5 and indicate that the highest viscosity was achieved using 70% glycerin carbonate and 30% alkoxylated alcohols.

Example 6

Figure 6:
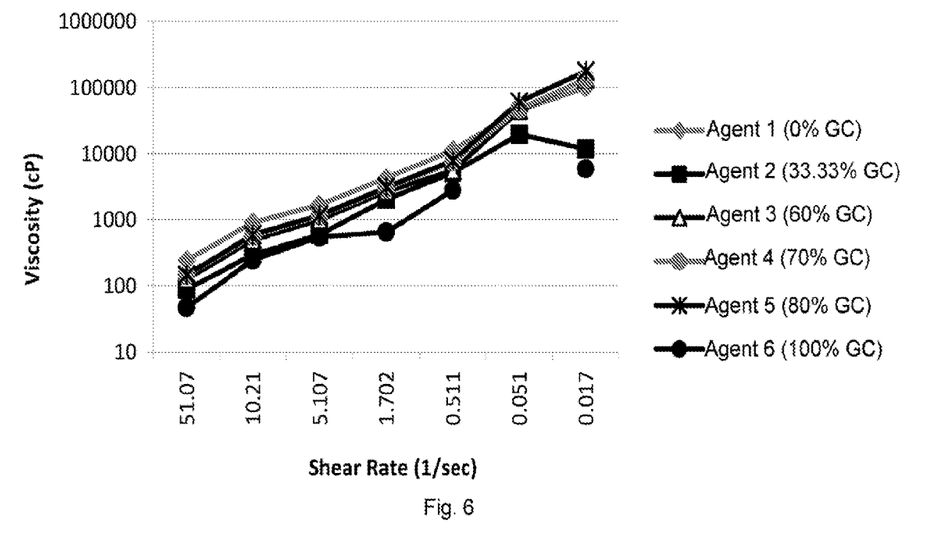
FIG. 6 is a graph showing the viscosity of various exfoliating agents in LPA-210.

The experiment of Example 1 was repeated, but the base oil used was LPA-210. The results are shown in FIG. 6 and indicate that the highest viscosity was achieved using 80% glycerin carbonate and 20% alkoxylated alcohols.

Example 7

Figure 7:
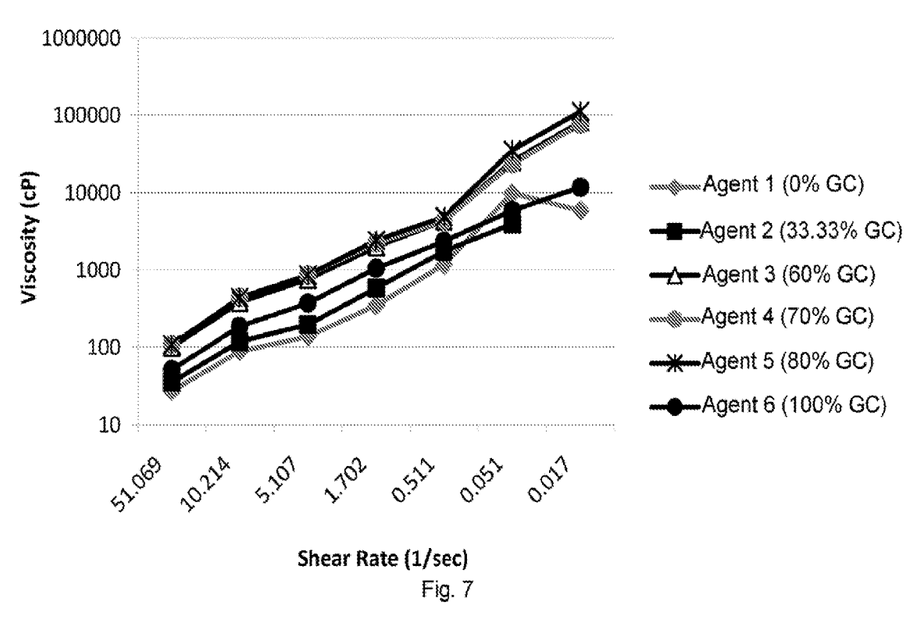
FIG. 7 is a graph showing the viscosity of various exfoliating agents in HF-1000.

The experiment of Example 1 was repeated, but the base oil used was HF-1000. The results are shown in FIG. 7 and indicate that the highest viscosity was achieved using 80% glycerin carbonate and 20% alkoxylated alcohols.

A summary of Examples 1-7 is shown in Table 3 below.

TABLE 3

| Solvent | Carbon Number | Carbon Range | Exfoliating Agent | Reference Viscosity @ 0.017 1/sec shear rate (cP) |
|---|---|---|---|---|
| Diesel | 17 | 10-24 | Agent 6 (100% glycerin carbonate) | 311,300 |
| ODC-15 | 13 | 10-16 | Agent 5 (80% Glycerin carbonate) | 164,500 |
| LPA | 13 | 10-16 | Agent 5 (80% Glycerin carbonate) | 41,100 |
| LPA-142 | 11 | 10-12 | Agent 4 (70% Glycerin carbonate) | 105,700 |
| LPA-170 | 13 | 12-14 | Agent 4 (70% Glycerin carbonate) | 88,100 |
| LPA-210 | 15 | 14-16 | Agent 5 (80% Glycerin carbonate) | 176,200 |
| HF-1000 | 14 | 12-16 | Agent 5 (80% Glycerin carbonate) | 111,600 |

As can be seen from the data in Table 3, the exfoliating agents of the present invention display a remarkable ability with most of the base oils to increase the viscosity of the compositions.

Comparative Example 8

To more fully demonstrate the efficacy of the exfoliating agents of the present invention, the procedure of Example 1 was followed using four of the base oils shown in Table 1. As noted above, one of the most widely used exfoliating agents used with oil based drilling fluids containing organophilic clays is propylene carbonate. By comparing the data in Table 3 above and Table 4 below, it can readily be seen that the exfoliating agent of the present invention is clearly superior to propylene carbonate at exfoliating the organophilic clay.

TABLE 4

| Solvent | Carbon Number | Carbon Range | Exfoliating Agent | Reference Viscosity @ 0.017 1/sec shear rate (cP) |
|---|---|---|---|---|
| Diesel | 17 | 10-24 | 100% Propylene carbonate | 0.0 |
| ODC-15 | 13 | 10-16 | 100% Propylene carbonate | 11,748 |
| LPA-170 | 13 | 12-14 | 100% Propylene carbonate | 0 |
| HF-1000 | 14 | 12-16 | 100% Propylene carbonate | 0 |

One of the advantages of the present invention is the fact that in the composition of the exfoliating agent and clay, water need not be present. As is well known, water in addition to reacting with the organophilic clay, may also interact with other additives such as guar gum, Xanthan gum, etc. Nonetheless, it is to be understood that in certain cases the addition of a small amount of water as a co-activator can further enhance the suspending characteristics of the resulting organophilic clay suspension medium. When used, water will generally be present in the composition in an amount from about 30 wt % to about 50 wt % based on the organophilic clay.

While in the above description, reference is made to the use of the exfoliating agents of the present invention in conjunction with organophilic clays used in wellbore fluids, it will be understood that the invention is not so limited. As well known to those skilled in the art, activated, organophilic clays are well known for their gelling and viscosity increasing ability in organic liquids of many types. Thus, in addition to wellbore fluids, e.g., drilling fluids, they find wide usage in paints, greases, and fiberglass resins. They may also be used in cosmetics, inks, and polishes.

It will be recognized that, when used as a wellbore fluid, the composition of the present invention may contain certain ingredients tailored to the specific use of the wellbore fluid. Thus, for example if the wellbore fluid was a sealing composition for sealing off subterranean zones, water soluble clays, cross-linking agents, dispersing agents, cements, fillers and the like can also be employed. In the case of viscosity well treatment fluid compositions suitable for use in managed pressure drilling (MPD), the composition can also include emulsifiers, wetting agents, fluid loss control additives and weighing materials. Still further, as is well known, completion fluids are generally comprised of clear brines containing such material as ammonium chloride, sodium chloride, sodium bromide, etc. The compositions of the present invention could be used to improve dispersion of additives of the resulting completion fluids so that the suspended particles remain suspended for longer periods of time or at higher temperatures before being introduced into completion fluids. Fracturing fluids according to the present invention in addition to the viscosifying package can include, proppants, certain polymeric materials and other ingredients. Methods of employing various wellbore fluids for certain purposes are well known to those skilled in the art and are also contemplated by the present invention. In general the wellbore fluids of the present invention can comprise an additive selected from the group consisting of emulsifiers, wetting agents, viscosifiers, weighting agents, fluid loss control agents, proppants, and particulate agents for forming gravel packs.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A wellbore fluid comprising:
   a hydrocarbon base oil comprising greater than 20% by weight naphthenics and 10 to 35% by weight isoparaffins;
   an exfoliating agent comprising glycerin carbonate and an alkoxylated alcohol having the general formula general formula:

$$R\diagdown O\left(\underset{R_2}{\overset{R_3}{\diagup}}O\right)_a\left(\diagup O\right)_b H$$

wherein R is a linear or branched alkyl from 2 to 18 carbon atoms or an aromatic radical having the structure:

wherein $R_1$ is a branched or linear alkyl having from 2 to 18 carbon atoms,
   $R_2$ is H or $CH_3$,
   $R_3$ is H or $CH_3$,
   a is from 0 to 12,
   and b is from 1 to 12; and
   an organophilic clay.

2. The wellbore fluid of claim 1, wherein said glycerin carbonate is present in an amount of 10 wt % to 100 wt % and said alkoxylated alcohol is present in an amount of up to 90 wt % based on the total exfoliating agent.

3. The wellbore fluid of claim 1, wherein said glycerin carbonate is present in an amount of 80 wt % and said alkoxylated alcohol is present in an amount of 20 wt % based on the total exfoliating agent.

4. The wellbore fluid of claim 1, wherein said glycerin carbonate is present in an amount of 70 wt % and said alkoxylated alcohol is present in an amount of 30 wt % based on the total exfoliating agent.

5. The wellbore fluid of claim 1, wherein said glycerin carbonate is present in an amount of 60 wt % and said alkoxylated alcohol is present in an amount of 40 wt % based on the total exfoliating agent.

6. The wellbore fluid of claim 1, wherein said organophilic clay is a smectite-type clay selected from the group consisting of bentonite, hectorite, montmorillonite, nontronite, biedellite, saponite, stevensite, and mixtures thereof.

7. The wellbore fluid of claim 1, wherein said organophilic clay is present in an amount of from 1 wt % to 5 wt % and said exfoliating agent is present in an amount of from 0.005 wt % to 1 wt % based on the total composition.

8. The wellbore fluid of claim 1, further comprising:
   water in an amount of 30 to 50 wt % based on said organophilic clay.

9. The wellbore fluid of claim 1, further comprising:
   an additive comprising at least one of emulsifiers, wetting agents, viscosifiers, weighting agents, fluid loss control agents, proppants, and particulate agents for forming gravel packs.

* * * * *